US010514677B2

(12) United States Patent
Meruva et al.

(10) Patent No.: US 10,514,677 B2
(45) Date of Patent: Dec. 24, 2019

(54) FRAMEWORKS AND METHODOLOGIES CONFIGURED TO ASSIST CONFIGURING DEVICES SUPPORTED BY A BUILDING MANAGEMENT SYSTEM

(71) Applicant: Honeywell International Inc., Morris Plains, NJ (US)

(72) Inventors: Jayaprakash Meruva, Bangalore (IN); John David Morrison, Mt. Coah (AU); Graeme Laycock, Hunters Hill (AU)

(73) Assignee: Honeywell International Inc., Morris Plains, NJ (US)

( * ) Notice: Subject to any disclaimer, the term of this patent is extended or adjusted under 35 U.S.C. 154(b) by 214 days.

(21) Appl. No.: 15/303,519

(22) PCT Filed: Mar. 20, 2015

(86) PCT No.: PCT/US2015/023234
§ 371 (c)(1),
(2) Date: Oct. 11, 2016

(87) PCT Pub. No.: WO2015/157018
PCT Pub. Date: Oct. 15, 2015

(65) Prior Publication Data
US 2017/0052529 A1 Feb. 23, 2017

(30) Foreign Application Priority Data
Apr. 11, 2014 (AU) ................. 2014901334

(51) Int. Cl.
*G05B 19/409* (2006.01)
*G06Q 10/06* (2012.01)
(Continued)

(52) U.S. Cl.
CPC ............ *G05B 19/409* (2013.01); *F24F 11/30* (2018.01); *G06Q 10/06* (2013.01);
(Continued)

(58) Field of Classification Search
CPC .... F24F 11/30; F24F 2110/00; F24F 2120/20; G05B 19/409; G05B 2219/25011; G06Q 10/06

See application file for complete search history.

(56) References Cited

U.S. PATENT DOCUMENTS 4,223,831 A 9/1980 Szarka
4,253,153 A 2/1981 Bitterli et al.
(Continued)

FOREIGN PATENT DOCUMENTS

CN 201225714 Y 4/2009
CN 101430545 B 11/2010
(Continued)

OTHER PUBLICATIONS

The International Preliminary Report on Patentability and Written Opinion of the International Searching Authority for Corresponding PCT Application No. PCT/US2015/023234, dated Jul. 14, 2015.
(Continued)

*Primary Examiner* — Michael J Huntley
(74) *Attorney, Agent, or Firm* — Seager Tufte & Wickhem LLP

(57) ABSTRACT

Described herein are frameworks and methodologies configured to assist configuring devices supported by a building management system. Embodiments of the invention have been particularly developed to allow commissioning of devices, such as HVAC components, to be performed more efficiently in the field. While some embodiments will be described herein with particular reference to that application, it will be appreciated that the invention is not limited to such a field of use, and is applicable in broader contexts.

18 Claims, 6 Drawing Sheets

(51) Int. Cl.
  *F24F 11/30* (2018.01)
  *F24F 110/00* (2018.01)
  *F24F 120/20* (2018.01)

(52) U.S. Cl.
  CPC ....... *F24F 2110/00* (2018.01); *F24F 2120/20* (2018.01); *G05B 2219/25011* (2013.01)

(56) References Cited

U.S. PATENT DOCUMENTS

| | | | |
|---|---|---|---|
| 4,340,797 A | 7/1982 | Takano et al. |
| 4,353,502 A | 10/1982 | Myers |
| 4,381,549 A | 4/1983 | Stamp, Jr. et al. |
| 4,431,134 A | 2/1984 | Hendricks et al. |
| 4,790,143 A | 12/1988 | Hanson |
| 5,065,813 A | 11/1991 | Berkeley et al. |
| 5,123,252 A | 6/1992 | Hanson |
| 5,161,606 A | 11/1992 | Berkeley et al. |
| 5,270,952 A | 12/1993 | Adams et al. |
| 5,284,024 A | 2/1994 | Hanson et al. |
| 5,345,226 A | 9/1994 | Rice, Jr. et al. |
| 5,395,042 A | 3/1995 | Riley et al. |
| 5,422,824 A | 6/1995 | Biehler et al. |
| 5,596,507 A | 1/1997 | Jones et al. |
| 5,682,329 A | 10/1997 | Seem et al. |
| 5,690,277 A | 11/1997 | Flood |
| 5,790,754 A | 8/1998 | Mozer et al. |
| 5,794,205 A | 8/1998 | Walters et al. |
| 6,083,270 A | 7/2000 | Scott |
| 6,192,282 B1* | 2/2001 | Smith ............... G05B 15/02 340/12.53 |
| 6,385,510 B1 | 5/2002 | Hoog et al. |
| 6,526,335 B1 | 2/2003 | Treyz et al. |
| 6,584,439 B1 | 6/2003 | Geilhufe et al. |
| 6,608,560 B2 | 8/2003 | Abrams |
| 6,813,221 B1 | 11/2004 | Barr |
| 6,988,070 B2 | 1/2006 | Kawasaki et al. |
| 7,108,194 B1 | 9/2006 | Hankins, II |
| 7,139,716 B1 | 11/2006 | Gaziz |
| 7,146,253 B2 | 12/2006 | Hoog et al. |
| 7,162,253 B2 | 1/2007 | Vare et al. |
| 7,184,960 B2 | 2/2007 | Deisher et al. |
| 7,280,643 B2 | 10/2007 | Howard et al. |
| 7,317,970 B2 | 1/2008 | Pienta et al. |
| 7,349,682 B1 | 3/2008 | Bennett, III et al. |
| 7,349,758 B2 | 5/2008 | Miro et al. |
| 7,397,363 B2 | 7/2008 | Joao |
| 7,436,292 B2 | 10/2008 | Rourke et al. |
| 7,436,296 B2 | 10/2008 | Rourke et al. |
| 7,451,937 B2 | 11/2008 | Flood et al. |
| 7,454,269 B1 | 11/2008 | Dushane et al. |
| 7,464,035 B2 | 12/2008 | Funk et al. |
| 7,522,063 B2 | 4/2009 | Ehlers |
| 7,747,446 B2 | 6/2010 | Blass et al. |
| 7,752,047 B2 | 7/2010 | Morris |
| 7,787,749 B2 | 8/2010 | Caspi et al. |
| 7,890,334 B2 | 2/2011 | Park et al. |
| 7,899,912 B2 | 3/2011 | Bisdikian et al. |
| 7,957,974 B2 | 6/2011 | Cho et al. |
| 8,013,730 B2 | 9/2011 | Oh et al. |
| 8,019,567 B2 | 9/2011 | Steinberg et al. |
| 8,032,254 B2 | 10/2011 | Amundson et al. |
| 8,042,048 B2 | 10/2011 | Wilson et al. |
| 8,068,881 B2 | 11/2011 | Schrager |
| 8,078,472 B2 | 12/2011 | Resch et al. |
| 8,099,289 B2 | 1/2012 | Mozer et al. |
| 8,107,989 B2 | 1/2012 | Budampati et al. |
| 8,155,767 B2 | 4/2012 | ElMankabady et al. |
| 8,175,884 B1 | 5/2012 | Morris |
| 8,218,738 B2 | 7/2012 | Diethorn et al. |
| 8,234,119 B2 | 7/2012 | Dhawan et al. |
| 8,239,922 B2 | 8/2012 | Sullivan et al. |
| 8,340,975 B1 | 12/2012 | Rosenberger |
| 8,411,590 B2 | 4/2013 | Wang |
| 8,422,889 B2 | 4/2013 | Jonsson |
| 8,428,067 B2 | 4/2013 | Budampati et al. |
| 8,447,598 B2 | 5/2013 | Chutorash et al. |
| 8,509,954 B2 | 8/2013 | Imes et al. |
| 8,516,087 B2 | 8/2013 | Wilson et al. |
| 8,527,278 B2 | 9/2013 | David |
| 8,556,188 B2 | 10/2013 | Steinberg |
| 8,582,792 B2 | 11/2013 | Chao et al. |
| 8,588,990 B2 | 11/2013 | Caceres et al. |
| 8,682,361 B2 | 3/2014 | Park et al. |
| 8,825,020 B2 | 9/2014 | Mozer et al. |
| 8,868,218 B2 | 10/2014 | Park et al. |
| 8,924,218 B2 | 12/2014 | Corpier et al. |
| 8,976,937 B2 | 3/2015 | Shapiro et al. |
| 9,124,999 B2 | 9/2015 | Junk |
| 9,136,913 B2 | 9/2015 | Schultz et al. |
| 9,363,346 B2* | 6/2016 | Sutardja ............ H04M 1/72533 |
| 9,465,377 B2 | 10/2016 | Davis et al. |
| 2002/0123896 A1 | 9/2002 | Diez et al. |
| 2002/0193989 A1 | 12/2002 | Geilhufe et al. |
| 2003/0034898 A1 | 2/2003 | Shamoon et al. |
| 2003/0036909 A1 | 2/2003 | Kato |
| 2003/0177012 A1 | 9/2003 | Drennan |
| 2003/0233432 A1 | 12/2003 | Davis et al. |
| 2005/0065796 A1* | 3/2005 | Wyss ............... G10L 15/30 704/270 |
| 2006/0161270 A1 | 7/2006 | Luskin et al. |
| 2006/0180676 A1 | 8/2006 | Park et al. |
| 2007/0012793 A1* | 1/2007 | Flood ............... F23N 5/20 236/51 |
| 2007/0135969 A1* | 6/2007 | Curl ............... G05D 23/1905 700/276 |
| 2007/0286181 A1 | 12/2007 | Bushmitch et al. |
| 2008/0037727 A1 | 2/2008 | Sivertsen et al. |
| 2008/0065456 A1* | 3/2008 | Labedz ............... G06Q 10/06 709/229 |
| 2008/0091432 A1 | 4/2008 | Dalton et al. |
| 2008/0175261 A1 | 7/2008 | Wang |
| 2008/0221714 A1 | 9/2008 | Schoettle |
| 2008/0235028 A1 | 9/2008 | Bodin et al. |
| 2009/0204262 A1 | 8/2009 | Nishimura |
| 2010/0058248 A1 | 3/2010 | Park |
| 2010/0087175 A1 | 4/2010 | Roundtree |
| 2011/0025469 A1 | 2/2011 | Erdmann et al. |
| 2011/0047418 A1 | 2/2011 | Drees et al. |
| 2011/0140914 A1 | 6/2011 | Pelech et al. |
| 2011/0307403 A1 | 12/2011 | Rostampour et al. |
| 2012/0203379 A1* | 8/2012 | Sloo ............... G05D 23/1902 700/276 |
| 2013/0035799 A1 | 2/2013 | Song et al. |
| 2013/0204619 A1* | 8/2013 | Berman ............... G10L 21/10 704/235 |
| 2013/0226579 A1 | 8/2013 | Wlasiuk |
| 2013/0297078 A1 | 11/2013 | Kolavennu |
| 2014/0312254 A1 | 10/2014 | Molino et al. |
| 2014/0330435 A1 | 11/2014 | Stoner et al. |
| 2015/0002046 A1 | 1/2015 | Schlangen |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0276254 A1 | 10/2015 | Nemcek et al. |

FOREIGN PATENT DOCUMENTS

| | | |
|---|---|---|
| CN | 101947788 A | 1/2011 |
| CN | 202092667 U | 12/2011 |
| CN | 102332204 A | 1/2012 |
| CN | 102436273 A | 5/2012 |
| EP | 1054387 A2 | 11/2000 |
| EP | 1119191 A2 | 7/2001 |
| EP | 1260886 A2 | 11/2002 |
| EP | 1345360 B1 | 7/2006 |
| EP | 1135757 B1 | 11/2006 |
| EP | 1415218 B1 | 2/2011 |
| GB | 2094208 A | 9/1982 |
| JP | 3803045 B2 | 8/2006 |
| JP | 2006208460 A | 8/2006 |
| JP | 2006317573 A | 11/2006 |
| JP | 4503310 B2 | 7/2010 |
| JP | 20100181064 A | 8/2010 |

(56) References Cited

FOREIGN PATENT DOCUMENTS

| | | |
|---|---|---|
| JP | 4533844 B2 | 9/2010 |
| JP | 20100236759 A | 10/2010 |
| JP | 4640178 B2 | 3/2011 |
| JP | 4839605 B2 | 12/2011 |
| KR | 20100026353 A | 3/2010 |
| KR | 20110012048 A | 2/2011 |
| KR | 20110045314 A | 5/2011 |
| KR | 20120017492 A | 2/2012 |
| KR | 101151571 B1 | 5/2012 |
| WO | 9313507 A1 | 7/1993 |
| WO | 9934339 A2 | 7/1999 |
| WO | 2006126192 A2 | 11/2006 |
| WO | 2007101164 A2 | 9/2007 |
| WO | 2008018102 A2 | 2/2008 |
| WO | 2008130095 A1 | 10/2008 |
| WO | 2009107211 A1 | 9/2009 |
| WO | 2009147927 A1 | 10/2009 |

OTHER PUBLICATIONS

"T2 RERC Rehabilitation Engineering Research Center on Technology Transfer, Accessible Thermostat," 40 pages, downloaded Jun. 6, 2013.
Action Talking Products LLC, "Kelvin Installation Manual," V1.5, pp. 1-15, downloaded Jul. 14, 2015.
Brown, et al., "Joint DoD/Industry Study on Opportunities in Integrated Diagnostics," Institute for Defense Analysis, 110 pages, Jan. 1990.
Carrier Comfort Network, "Carrier Comfort System VVT III," 6 pages, Aug. 1996.
Carvalho et al., "Voice Thermostat Remote Control," Proceedings of the IEEE 25th Annual Northeast Bioengineering Conference, pp. 59-60, Apr. 8-9, 1999.
Coleman (a Johnson Controls Company), "Hints for Homeowner's, A Thermostat That Speaks to Consumer's Needs," 1 page, on or before Jul. 20, 2006.
International Search Report for PCT application serial No. pct/us2013/039326, dated Aug. 6, 2013.
Honeywell, "PM7006A Network Compatible Computer Room Air Conditioning (CRAG) Program Module for W7600 Control Module," 72 pages, Aug. 1993.
http://www.accendaproducts.com/kelvin/index.html, "Kelvin Voice Operated Thermostat," 2 pages, printed Dec. 9, 2013.
http://www.automatedliving.com, "Control Your Home by Voice or the Web, Anytime Anywhere," 4 pages, printed Dec. 9, 2013.
http://www.broadenedhorizons.com/voiceir/, VoiceIR Environmental Voice Controller Configurator—Broadened Horizons, 17 pages, Dec. 9, 2013.
http://www.innotechsystems.com/voice.htm, "Voice Recognition & Voice Interactive Products," 1 page, printed Dec. 9, 2013.
http://www.rciautomation.com/thermostat_phone.htm, "Telephone Controlled Thermostat," 4 pages, printed Dec. 9, 2013.
http://www.talkingthermostats.com/blind.shtml, "Talking Thermostats for Persons who are blind," 3 pages, printed Dec. 12, 2013.
https://github.com/chilitechno/SiriProxy-NestLearningthermostat, "Siri Proxy-NestLearning Thermostat," 3 pages, printed Jan. 6, 2014.
https://github.com/plamoni/SiriProxy, "SiriProxy," 7 pages, printed Dec. 9, 2013.
https://storify.com/plumbingtips969/a-thermostat-that-speaks-to-a-consumer-s-needs, "A Thermostat That Speaks to a Consumer's Needs," 3 pages, printed Jul. 14, 2015.
Jacobson, "Design: A Voice Activated Thermostat," Biomedical Sciences Instrumentation, Technical Papers Composing the Proceedings of the 29th Annual Rocky Mountain Bioengineering Symposium & 29th International ISA Biomedical Sciences Instrumentation Symposium, vol. 28, pp. 15-19, 1992.
Lacquet et al., "Short Communications, An Affordable Digital-Display-to-Natural-Voice Converter for Visually Impaired Radio Amateurs," IEEE Transactions on Rehabilitation Engineering, vol. 4, No. No. 4, 6 pages, Dec. 1996.
Lee et al., "Fault Detection in an Air-Handling Unit Using Residual and Recursive Parameter Identification Methods," ASHRAE Transactions vol. 102, Pt. 1, pp. 1-22, 1996.
Lopez et al., "Temperature and Humidity Laboratory Remote Controller," Journal of the Mexican Society of Instrumentation, pp. 14-20, 1996.
Miles et al., "An Audible Thermostat for the Blind or Visually Challenged," Proceedings of the IEEE 23rd Northeast Bioengineering Conference, pp. 68-69, May 21-22, 1997.
Piette et al., "Model-Based Chiller Energy Tracking for Performance Assurance at a University Building," Cool Sense National Forum on Integrated Chiller Retrofits, San Francisco, Calif, LBNL Report-40781, 18 pages, Sep. 1997.
SmartWay Solutions, Inc., "Talking Thermostat Model VT3000, User's Guide," pp. 1-20, downloaded Jul. 14, 2015.
Systems Controls & Instruments, LLC, "CEM-24 Series Owner's Manual—Installation and Operating Instructions," 32 pages, downloaded Jul. 14, 2015.
Talkingthermostats.com, "Comfort Solutions for Persons Who are Blind or have Low Vision, VIP 3000 Residential Talking Thermostat that Promotes Independent Living," 2 pages, on or before Aug. 19, 2011.
Venstar, "Comfort Call System ACCO433 Owner's Manual," 24 pages, Aug. 2007.
Walters, "Siri Hack Allows Voice Control of Home Thermostat," found at http://www.extremetech.com/computing/106073-siri-hack-allows-voice-control-of-home . . . , 2 pages, Nov. 21, 2011.
Watt, "Development of Empirical Temperature and Humidity-Based Degraded-Condition Indicators for Low-Tonnage Air-Conditioners," Thesis, ESL-TH-97/12-03, 205 pages, Dec. 1997.
Watt, "Predictive Maintenance Programs (PMP's) in Small HVAC Applications: Analysis of Available Products and Technology," ESL Report from Paper Prepared for MEEN 662, 4 pages, Apr. 1994.
Web.archive.org/web20030215020919/http:www.jdstechnologies.com/stargate.html, "Stargate Interactive Automation System: JDS Technologies," 9 pages, printed May 9, 2013.

* cited by examiner

```xml
<Scenario name="VAV Zero Balancing" version="1.0">
  <Activities>
    <Activity Id="1" Type = "User" >
      <DisplayText> Check whether damper rod is connected to the actuator?</DisplayText>
    </Activity>
    <Activity Id="2" Type = "System" >
      <DisplayText> Closing Damper to zero position?  </DisplayText>
    </Activity>
    <Activity Id="3" Type = "User" >
      <DisplayText> Damper has closed fully, please measure airflow values and submit.  </DisplayText>
    </Activity>
  </Activities>
  <Parameters>
    <Parameter Id="StepStatus" Index="1" Mode="IN" DataType="STRING"></Parameter>
    <Parameter Id="MeasuredAirflowValue" Index="2" Mode="IN" DataType="FLOAT"></Parameter>
  </Parameters>
  <Transitions>
    <Transition Id="1" From="1" To="2">
      <Condition>StepStatus == "Success"</Condition>
    </Transition>

<Transition Id="2" From="1" To="End">
      <Condition>StepStatus == "Failed"</Condition>
    </Transition>

<Transition Id="3" From="2" To="3">
      <Condition>DamperPosition == "0%"</Condition>
    </Transition>
  </Transitions>
</Scenario>
```

FRAMEWORKS AND METHODOLOGIES CONFIGURED TO ASSIST CONFIGURING DEVICES SUPPORTED BY A BUILDING MANAGEMENT SYSTEM

This application is a 371 of International Application No. PCT/US2015/023234 filed Mar. 30, 2015 which claims priority to AU 2014901334 filed Apr. 11, 2014.

FIELD OF THE INVENTION

The present invention relates to frameworks and methodologies configured to assist configuring devices supported by a building management. Embodiments of the invention have been particularly developed to allow commissioning of devices, such as HVAC components, to be performed more efficiently in the field. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

In the context of field devices supported by a Building Management System (BMS), conventionally, commissioning tasks are often necessary. These may include as point to point checkout (hardware checkout), functional checkout (sequence of operations checkout), VAV balancing, water balancing, and the like. Most commissioning tasks require two technicians: one technician at a terminal connected to the BMS (for example a HVAC Panel) and another technician at the field device. These two technicians typically interact over radio communication thereby to confirm their respective operations.

The use of wireless (for example handheld) commissioning devices might reduce the need for two technicians, but is not ideal in many situations. For example, in some commissioning activities user has to climb on ladders (or otherwise move into awkward positions) to access field devices. Furthermore, technicians may already have their hands full with measuring devices such as anemometers, multi meters and balometer flow hoods.

SUMMARY OF THE INVENTION

It is an object of the present invention to overcome or ameliorate at least one of the disadvantages of the prior art, or to provide a useful alternative.

One embodiment provides a computer implemented method for enabling an interactive commissioning process in respect of a field device, the method including:

maintaining access to a repository of workflow sequences, wherein each workflow sequence includes:

(i) one or more user activities, which are configured to be completed by voice-delivered responses to audible prompts; and (ii) one or more system activities, which are performed as automated processes by way of interaction with a building management system;

executing a given one of the workflow sequences, including delivering a first audible prompt for a first user activity, and upon receiving and recording a voice-delivered response from a user to the first audible prompt, and subject to processing of the recorded response, progressing through the remainder of the workflow sequence.

One embodiment provides a computer implemented method for defining an interactive commissioning process in respect of a field device, the method including:

defining a workflow sequences, wherein the workflow sequence includes:

(i) one or more user activities, which are configured to be completed by voice-delivered responses to audible prompts; and (ii) one or more system activities, which are performed as automated processes by way of interaction with a building management system;

providing the workflow sequence to an execution module, wherein the execution module is configured to execute on a device that interacts via voice-based prompts delivered to a field technician and voice-based responses provided by the field technician.

One embodiment provides a device configured to enable an interactive commissioning process in respect of a field device, the device including:

a module configured to access to a repository of workflow sequences, wherein each workflow sequence includes:

(i) one or more user activities, which are configured to be completed by voice-delivered responses to audible prompts; and (ii) one or more system activities, which are performed as automated processes by way of interaction with a building management system;

an execution module configured to deliver each of the workflow sequences, wherein delivering a first of the workflow sequences includes delivering a first audible prompt for a first user activity, and upon receiving and recording a voice-delivered response from a user to the first audible prompt, and subject to processing of the recorded response, progressing through the remainder of the workflow sequence.

One embodiment provides a computer program product for performing a method as described herein.

One embodiment provides a non-transitory carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which:

FIG. 4 illustrates sample transactional grammar.

DETAILED DESCRIPTION

Described herein are frameworks and methodologies configured to assist configuring devices supported by a building management. Embodiments of the invention have been particularly developed to allow commissioning of devices, such as HVAC components, to be performed more efficiently in the field. While some embodiments will be described herein with particular reference to that application, it will be appreciated that the invention is not limited to such a field of use, and is applicable in broader contexts.

Overview

Various embodiments provide computer implemented methods for enabling an interactive commissioning process in respect of a field device. For example, such methods are performed on a computing device based on execution of computer executable code stored on a non-transitory carrier media (for example including a computer hard drive). In overview, the method includes executing one or more workflow sequences, from a repository of workflow sequences. Each workflow sequence, in some embodiments, is embodied in a discrete "app". In other embodiments multiple workflow sequences are executable via a common software application. Each workflow sequence includes:

(i) one or more user activities, which are configured to be completed by voice-delivered responses to audible prompts; and (ii) one or more system activities, which are performed as automated processes by way of interaction with a building management system (BMS);

Execution of a workflow sequence includes iteratively working through a series of these user activities and system activities, and implementing a series of rules governing the completion of those activities. In very broad terms, voice prompts guide a user through user actions, which might involve interacting with the field device, taking measurements, and so on. Responses are audibly provided. Depending on the internal logic and ordering of a given workflow sequence, completion of a user activity may trigger a system activity, which is automatically completed by way of software-driven interaction with the BMS. This may, in some cases, result in the BMS interacting with the field device via a control network. Audible voice-based update messages are optionally provided to the user during that process.

Exemplary Frameworks

Figure 1A:
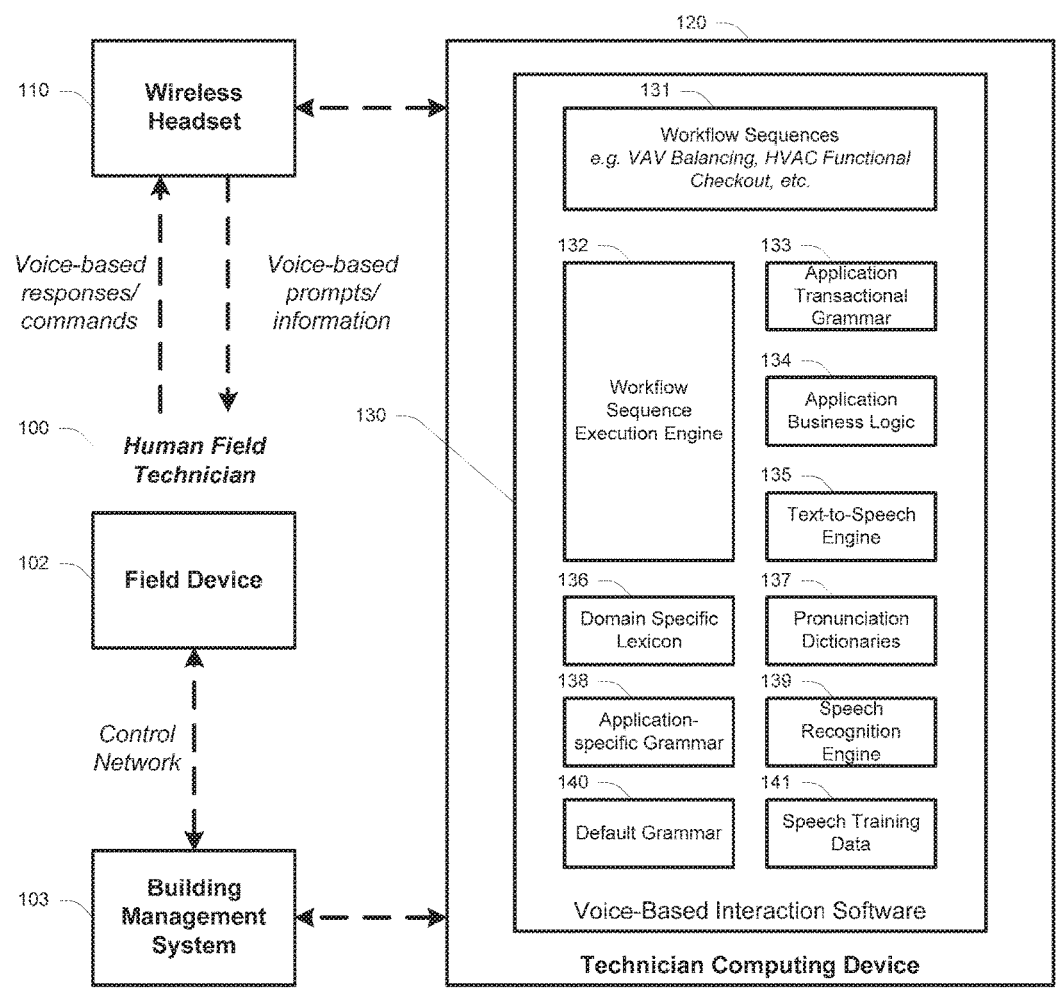
FIG. 1A schematically illustrates a framework according to one embodiment.
Figure 1B:
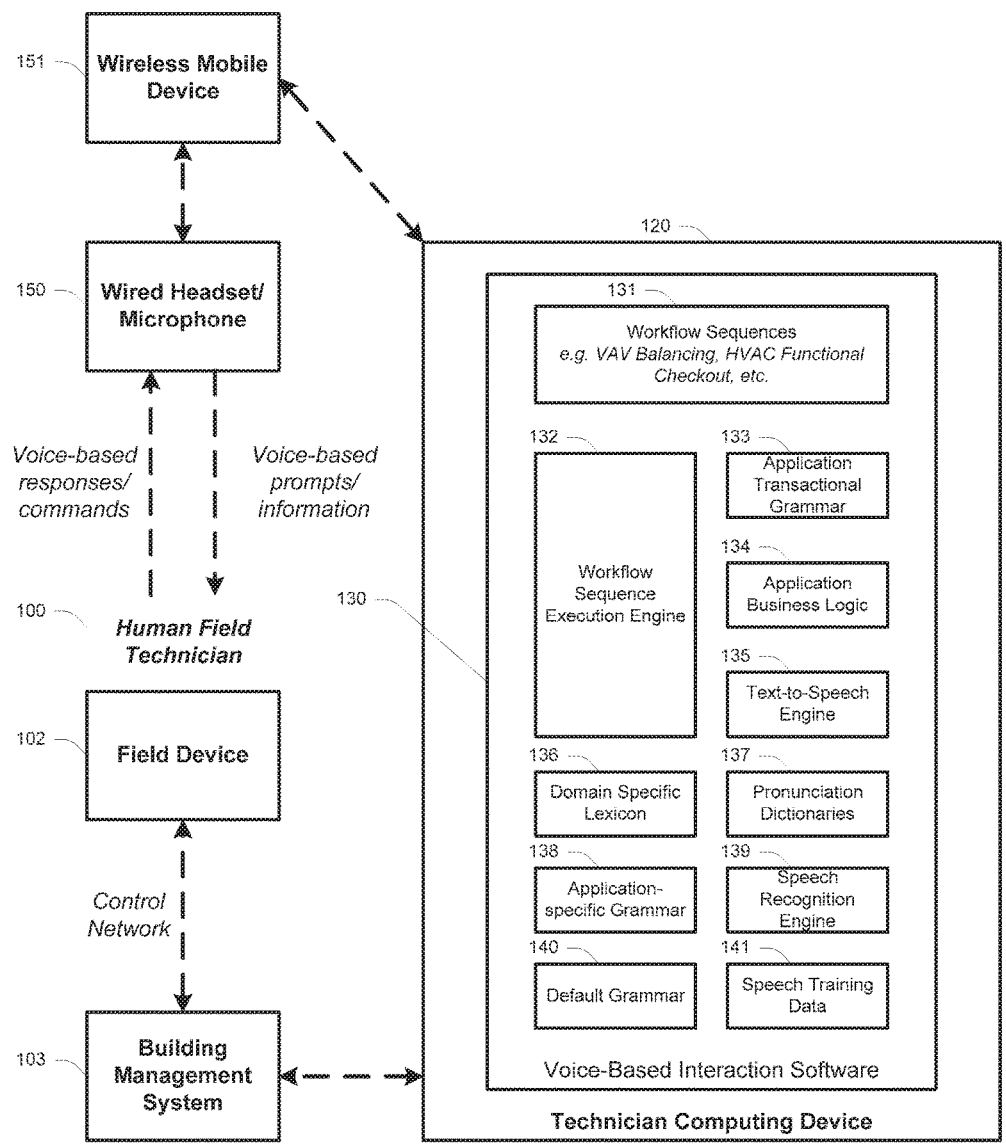
FIG. 1B schematically illustrates a framework according to one embodiment.

FIG. 1A and FIG. 1B illustrate exemplary frameworks according to embodiments. FIG. 2C illustrates a prior art arrangement for a similar situation. In each case, a human field technician 100 is required to perform commissioning functions in respect of a field device 102. The field device is supported by a BMS 103. For example, a control network (and one or more controller devices) communicatively couple field device 102 to BMS 103.

Figure 1C:
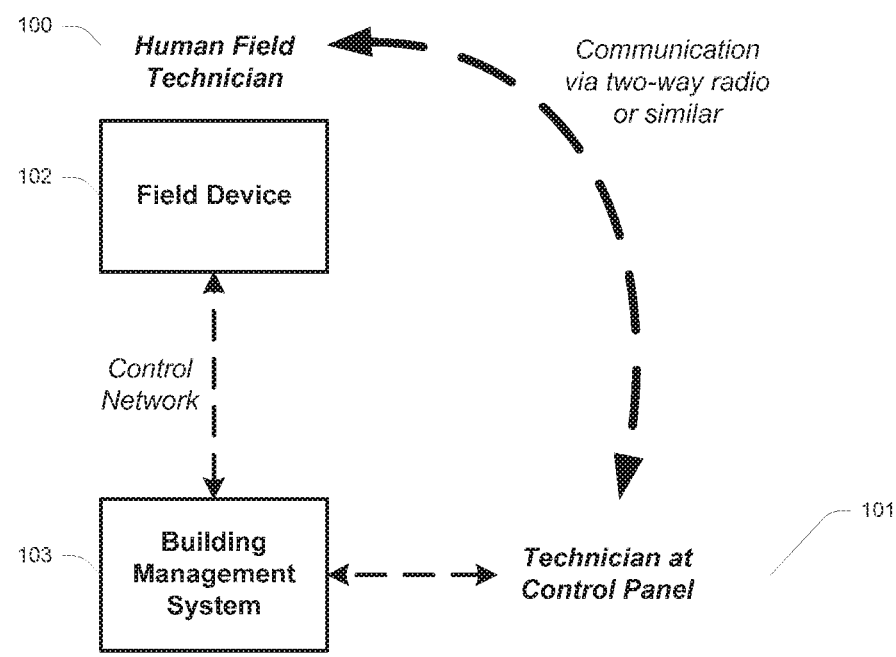
FIG. 1C schematically illustrates a prior art arrangement.

In the prior art example of FIG. 1C, human field technician 100 communicates via a two way radio (or the like) with a further technician 101 who is positioned to operate a control panel of BMS 103. For example, this may be an HVAC control panel which is part of an HVAC system to which device 102 belongs. Technician 101 liaises with technician 100 thereby to collaboratively take measurements and have those entered into BMS 103, ensure device 102 is in an appropriate state before BMS-driven operations are performed, and so on. Such operations are referred to broadly as "commissioning" operations. Specific examples include:

In the context of VAV balancing, measuring and feeding measured airflow value into the system.

In the context of testing a temperature sensor, verifying values for no response test by disconnecting wires, feeding actual measured value which is measured with certified device, and recording wire tag number into the system.

It will be appreciated that these are provided as contextual examples only, and are not intended to be limiting in any way.

In general terms, the technology herein provides a solution, which uses speech synthesizer and speech recognition capabilities that reduces the number of technicians required in a site to perform commissioning activities for various forms of BMS-supported field devices. This includes enabling technicians to record observations through voice technology when in compromising situations (for example atop ladders and the like). In one example, a field technician is responsible for VAV balancing. The technician connects his laptop to an HVAC controller at the relevant panel, and uses voice-based interaction with software running on the laptop to engage in an interactive workflow sequence to enable VAV balancing to be completed.

In the examples of FIGS. 1A and 1B, the further technician 101 is replaced by IT components. This allows field technician 100 to act alone, resulting in substantial efficiency increases.

Referring initially to the example of FIG. 1A, field technician 100 acts solo, and in doing so utilises a wireless headset (i.e. a device having a microphone functionality, speaker functionality, and ability to wirelessly communicate with a third party device). The user provides, via headset 110, voice-based responses and commands, which are delivered to a technician computing device 120. The user is provided, via headset 110, voice-based prompts and/or information, these originating from technician computing device 120. In the example of FIG. 1B, headset 110 is replaced by a wired headset/microphone 150 (or, in some cases, a wireless headset) which is coupled to a wireless mobile device, that device in turn being wirelessly communicatively coupled to computing device 120. In a further embodiment, functionalities of devices 151 and 120 are integrated into a single device.

Device 120 executes voice-based interaction software 130. Software 130 is described by reference to a number of functionally identifiable components. In some cases one or more of these components are provided by distinct applications, which collectively form what is conceptually described as software 130. That is, software 130 may describe a first piece of proprietary software in combination with one or more pieces of third party software with which the proprietary software interacts.

Software 130 includes (or maintains access to) a repository of workflow sequences 131. For example, these are workflow sequences for various technician operations. Administrative software functionalities are provided to assist with the generation of workflow sequences, which includes defining one or more user activities, one or more system activities, exception/success/other rules for each activity, and logic interrelating the activities. This creates a logical process for each workflow sequence, enabling these to execute autonomously upon initiation, based on input received from system and user activities.

In some embodiments workflow sequences are each defined by an individual "app", which is independently executed. In other cases they are files, or other form of processes, which are able to be loaded and executed by a specially adapted software application.

In the examples of FIG. 1A and FIG. 1B, a workflow sequence execution engine 132 is configured for coordinating the execution of workflow sequences. Engine 132 is configured to load data indicative of a given workflow sequence, and coordinate execution based on rules and logic associated with that workflow sequence. Engine 132 operates in conjunction with application transactional grammar data 133 (which provides data indicative of grammatical instructions used to provide specific voice-based commands in software 130, such as request for system parameter values and the like) and application business logic 134.

A text-to-speech engine 135 is configured for converting text data into voice data. This text-to-speech engine operates in conjunction with a domain specific lexicon 136 which provides pronunciation data for a BMS domain vocabulary. This enables engine 135 to pronounce terms/words which are specific to a BMS environment (i.e. domain specific words) with correct phonemes. This combines with conventional pronunciation dictionaries (optionally both general and user-specific), which facilitate pronunciation of standard (i.e. non domain specific) words.

A speech recognition engine 139 is configured to operate with application-specific grammar and default grammar 140. The former is indicative specific grammatical rules defined for enabling interaction with application 130 in the context of workflow sequences. In this manner, the grammar required for commissioning procedures are supplied to the engine, which is used to recognize user commands properly through voice. The default grammar, and application feature specific grammar are dynamically switched based on context. Speech training data 141 assists software 130 improve accuracy in voice recognition over time.

In some cases device 130 is part of the wireless mobile device, and the mobile device directly communicates to BMS 103 wirelessly. In this scenario the mobile device itself act as technician computing device.

Workflow Sequences

As noted, the technology described herein relates to executing workflow sequences thereby to assist in commissioning (or otherwise performing actions in respect of) field devices that are supported by a BMS. Each workflow sequence (which may be defined as a discrete "app", or as a procedure executable via an application, includes:

(i) one or more user activities, which are configured to be completed by voice-delivered responses to audible prompts; and (ii) one or more system activities, which are performed as automated processes by way of interaction with a building management system (BMS);

In preferred embodiments, a user activity is an activity that needs to be performed by a field user. Each user activity requires user interaction to cause the activity to perform and finish. Upon start of this activity, an audible voice-based prompt announces what the user has to perform (this being generates through voice via the speech synthesizer). Once the user completes his task(s), he can record the status of the task (for example confirming completion, announcing readings, etc.) through voice. The status will be translated to text form through a speech recognizer and will be persisted in the system.

For example: in the context of VAV balancing user activities include, at least in one embodiment:

"Checking whether damper rod is connected to an actuator". The user is prompted to check whether a damper rod is connected to its actuator in a physical VAV. The user then responds with either a "confirm" response, or a "fail" response (noting that various semantics may be used).

"Measuring airflow value". The user is prompted to make an airflow measurement value using an anemometer, and supply the data (i.e. by audibly relaying measurements).

A system activity is an activity performed by the system automatically. For example, a system activity is fully controlled by the automated computer processes, i.e. the computer system proceeds with execution of an activity automatically, and completes the activity as soon as a transition condition is satisfied (or, for example, predefined exceptions are observed). Upon commencement of a system activity, the computer system announces the activity audibly through an audible signal (for example a voice-based rendering of text data), and starts performing the activity automatically. A user is in some embodiments enabled to check a current state of an activity by querying the system through voice commands. The computer system in response defines a response message and replies through a voice signal. The computer system also announces once activity is completed, and updates the status such that a next activity in the workflow sequence can commence.

By way of example, in some embodiments a system activity in VAV balancing is the closing of a damper, or rotating of a damper to a specific set point value. While executing activities, user is enabled to query the system to know the current controller parameter values. The query is translated to system commands through speech recognition, which in turn is translated to respective device and parameter addresses on the BMS network, thereby to obtain live values from the controller. The live values are transferred audibly to the technician as reply messages in the form of voice through the speech synthesizer.

Preferably, each activity has a success status and exception/error status, timeout period. In case of error status, the system ends the workflow, and is prevented from proceeding further until that status is turned to success status. In case of a timeout, the system announces a warning message to the user.

In some cases, a transition condition includes an expression which is evaluated to permit the completion of an activity. It can also be unconditional, meaning that it waits for timeout condition or for a user command to complete the activity.

In a preferred embodiment, each activity has a "Timeout Condition", which is used to raise a warning/exception upon the expiration of a specific period of time. For user activities, when a timeout condition is met, the system may be configured to announce a "motivational statement", which may be either a standard statement (e.g. a reminder "we are still waiting for you to complete task name") or a specific user-defined statement defined for an activity. In some cases the statement may mention typically how much time it is anticipated to take to perform the relevant activity. For a system activity, when a timeout condition is met, it one form of response is to make a verbal announcement that system could not perform this activity due to some reason, and request user manual intervention to verify system issues.

Activities may also include an optional tag, which indicates whether it is allowable or prohibited to skip a given step in the context of a workflow sequence. Additionally, a set of BMS Parameters are maintained by the commissioning application, which can be accessed by given activities to answer user queries or used by the commissioning workflow system in an evaluation of conditional expressions.

Figure 2:
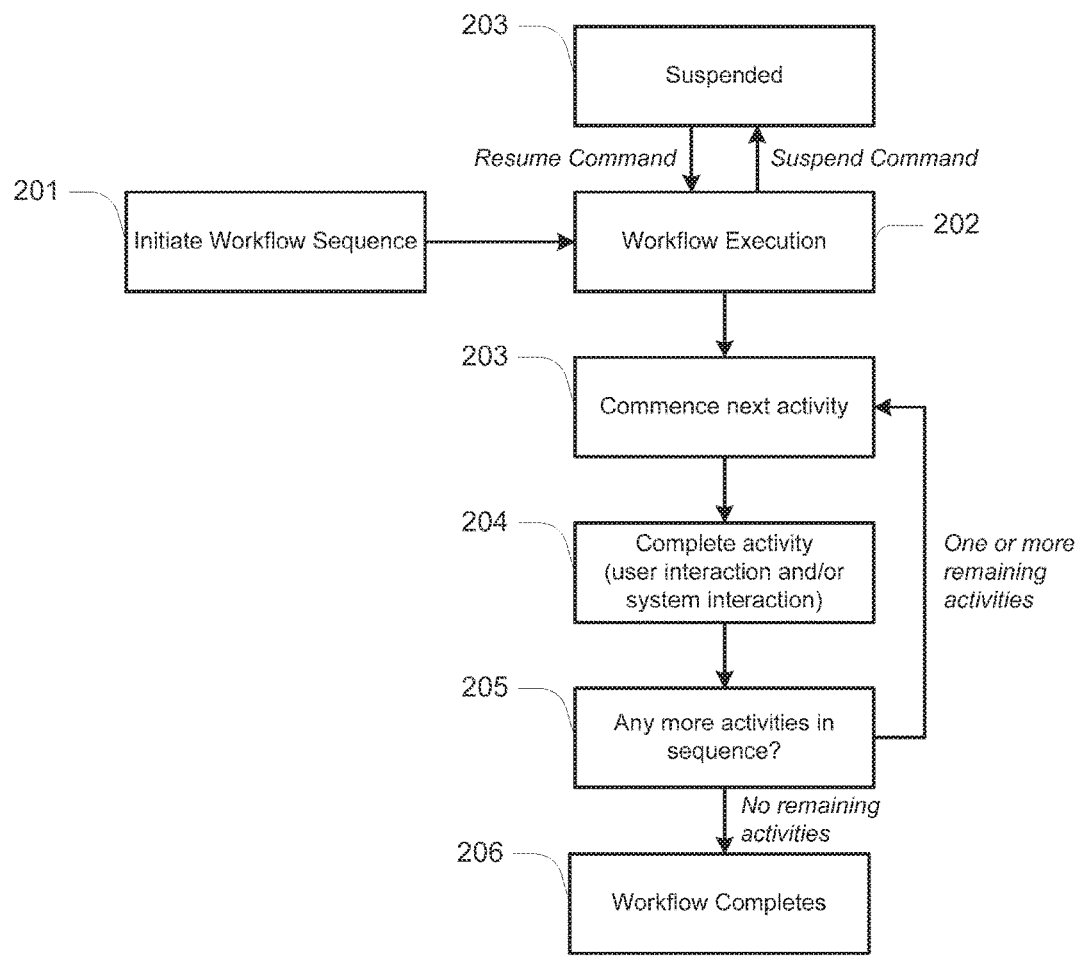
FIG. 2 illustrates a method according to one embodiment.

FIG. 2 illustrates an exemplary method according to one embodiment, being a method for executing a workflow sequence. Block 201 represents initiation of a workflow sequence. This may occur as a result of manual interaction with device 120, a voice command received by software 130, or based on context (for example by reference to a previously completed workflow). Blocks 202 and 203 represent execution and suspension of execution, subject to suspend and resume commands.

A next activity is commenced (being a user activity or system activity) at 203, and that activity is completed (successfully) at 204. If there are further activities in the sequence based on a determination at 205, the method loops back to 203. Otherwise the workflow completes at 206.

EXAMPLE—VAV BALANCING OPERATION

Figure 3:
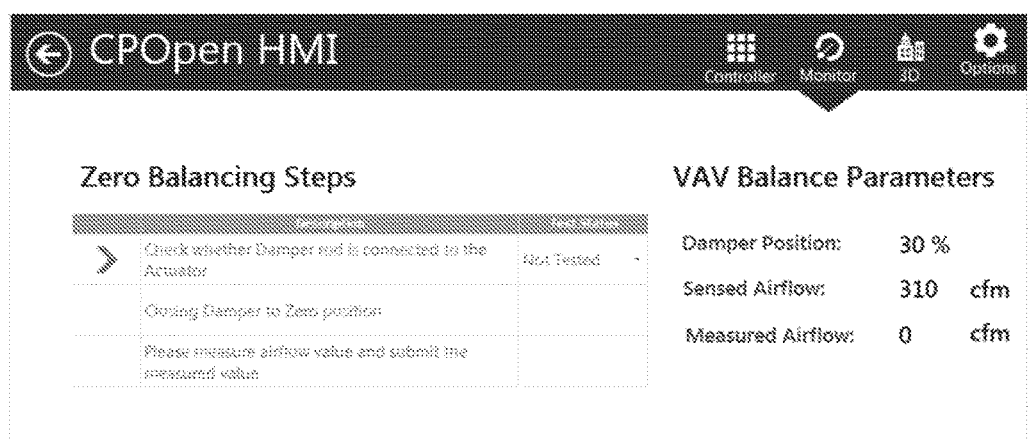
FIG. 3 illustrates an exemplary screenshot.

FIG. 3 provides a partial screen shot from an exemplary implementation of software 130, showing a selection of activities defining a workflow sequence for zero-balancing a VAV. This commences with a user activity to check whether a damper rod is connected to the relevant actuator. Assuming this is successful for example a (a "confirm" response), a system activity is initiated to control the damper actuator to move to a zero position. Once the damper doses fully, a user activity instructs the technician to measure airflow value (using an anemometer or balometer flow hoods, for example), and the measured airflow value is reported verbally (and then entered into the system). This is followed by a system activity whereby to the controller uses the measured airflow value to drive the VAV damper to a correct setpoint value. FIG. 4 shows sample transactional grammar for success flow of this zero balancing scenario.

CONCLUSIONS AND INTERPRETATION

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method for enabling an interactive commissioning process in respect of a field device, the method including:
   maintaining access to a repository of workflow sequences, wherein each workflow sequence includes:
      (i) one or more user activities, which are configured to be completed by voice-delivered responses to audible prompts; and
      (ii) one or more system activities, which are performed as automated processes by way of interaction with a building management system;
      wherein the one or more system activities include a transition condition to be met in order to complete the execution of the system activity;
      wherein at least one of the user activities or the system activities includes a tag indicating whether it is allowable to skip at least part of the workflow sequence;
   executing a given one of the workflow sequences, including delivering a first audible prompt for a first user activity, and upon receiving and recording a voice-delivered response from a user to the first audible prompt, and subject to processing of the recorded response, progressing through the remainder of the workflow sequence;
   wherein during at least one workflow sequence, receiving from the user a voice-based request for one or more parameter values, and in response to the voice based request, obtaining the one or more requested parameter values from the building management system, and providing a voice-based output of the obtained one or more requested parameter values; and
   wherein during at least one workflow sequence, providing a voice-based instruction to the user to obtain a measure of a desired parameter value, and in response to the voice-based instruction, receiving a value for the desired parameter value, reported verbally by the user, and entering the received value for the desired parameter value into the building management system.

2. A method according to claim 1 including, for at least one system activity, providing audible voice signals representing progress of completion of the system activity.

3. A method according to claim 1 wherein the method is performed via a computing device, and the voice-delivered responses are transmitted via a wireless microphone device.

4. A method according to claim 1 wherein the method is performed via a computing device, and the voice-delivered responses are transmitted via a mobile device that is coupled to a microphone device.

5. A method according to claim 1 including operating a voice synthesizer that accesses a BMS pronunciation lexicon.

6. A method according to claim 1 including operating a voice recognition engine that is configured to recognise commissioning commands via predefined application-specific grammar.

7. A method according to claim 6 wherein the voice recognition engine is configured to switch between default grammar recognition and application-specific grammar recognition.

8. A method according to claim 1 wherein the one or more user activities include user activities prompting the user to perform one or more of the following:
   report on a state of the field device;
   progress the field device into a specified mechanical state;
   progress the field device into a specified software state; and
   perform and report on one or more measurements made with a secondary device.

9. A method according to claim 1 wherein each activity includes a success condition, exception/error condition, and a timeout period.

10. A method according to claim 1 including updating a voice synthesized that accesses a BMS pronunciation lexicon based on technical terms used in prompts and/or responses for the workflow sequence.

11. A computer implemented method for defining an interactive commissioning process in respect of a field device, the method including:
   defining a workflow sequences, wherein the workflow sequence includes:
      (i) one or more user activities, which are configured to be completed by voice-delivered responses to audible prompts; and
      (ii) one or more system activities, which are performed as automated processes by way of interaction with a building management system;
      wherein the one or more system activities include a transition condition to be met in order to complete the execution of the system activity;
      wherein at least one of the user activities or the system activities includes a tag indicating whether it is allowable to skip at least part of the workflow sequence;
   providing the workflow sequence to an execution module, wherein the execution module is configured to execute on a device that interacts via voice-based prompts delivered to a field technician and voice-based responses provided by the field technician;
   wherein during at least one workflow sequence, receiving from the user a voice-based request for one or more parameter values, and in response to the voice based request, obtaining the one or more requested parameter values from the building management system, and providing a voice-based output of the obtained one or more requested parameter values; and
   wherein during at least one workflow sequence, providing a voice-based instruction to the user to obtain a measure of a desired parameter value, and in response to the voice-based instruction, receiving a value for the desired parameter value, reported verbally by the user, and entering the received value for the desired parameter value into the building management system.

12. A method according to claim 11 including, for at least one system activity, defining a rule requiring audible voice signals representing progress of completion of the system activity.

13. A method according to claim 11 wherein the one or more user activities include user activities prompting the user to perform one or more of the following:

report on a state of the field device;
progress the field device into a specified mechanical state;
progress the field device into a specified software state; and
perform and report on one or more measurements made with a secondary device.

14. A device configured to enable an interactive commissioning process in respect of a field device, the device including:
 a module configured to access to a repository of workflow sequences, wherein each workflow sequence includes:
  (i) one or more user activities, which are configured to be completed by voice-delivered responses to audible prompts; and
  (ii) one or more system activities, which are performed as automated processes by way of interaction with a building management system;
 wherein the one or more system activities include a transition condition to be met in order to complete the execution of the system activity;
 wherein at least one of the user activities or the system activities includes a tag indicating whether it is allowable to skip at least part of the workflow sequence;
 an execution module configured to deliver each of the workflow sequences, wherein delivering a first of the workflow sequences includes delivering a first audible prompt for a first user activity, and upon receiving and recording a voice-delivered response from a user to the first audible prompt, and subject to processing of the recorded response, progressing through the remainder of the workflow sequence;
 a voice command processing engine that is configured to receive from the user a voice-based request for one or more requested parameter values, and wherein the device is configured to, in response to the voice based request, obtain the one or more requested parameter values from the building management system and provide a voice-based output of the obtained one or more requested parameter values; and
 wherein the device is further configured to provide a voice-based instruction to the user to obtain a measure of a desired parameter value, and in response to the voice-based instruction, receive a value for the desired parameter value, reported verbally by the user, and enter the received value for the desired parameter value into the building management system.

15. A device according to claim 14 wherein delivering a given workflow sequence includes, for at least one system activity, providing audible voice signals representing progress of completion of the system activity.

16. A device according to claim 14 including a voice synthesizer that accesses a BMS pronunciation lexicon.

17. A device according to claim 14 including a voice recognition engine that is configured to recognize commissioning commands via predefined application-specific grammar.

18. A device according to claim 14 wherein the one or more user activities include user activities prompting the user to perform one or more of the following:
 report on a state of the field device;
 progress the field device into a specified mechanical state;
 progress the field device into a specified software state; and
 perform and report on one or more measurements made with a secondary device.

* * * * *